(12) United States Patent
Tsushima

(10) Patent No.: US 8,775,045 B2
(45) Date of Patent: Jul. 8, 2014

(54) LEFT-RIGHT WHEEL DRIVE FORCE DISTRIBUTION CONTROL APPARATUS FOR A VEHICLE

(75) Inventor: Yohei Tsushima, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 35 days.

(21) Appl. No.: 13/700,359

(22) PCT Filed: Jul. 5, 2011

(86) PCT No.: PCT/JP2011/065399
§ 371 (c)(1),
(2), (4) Date: Nov. 27, 2012

(87) PCT Pub. No.: WO2012/005265
PCT Pub. Date: Jan. 12, 2012

(65) Prior Publication Data
US 2013/0073161 A1   Mar. 21, 2013

(30) Foreign Application Priority Data

Jul. 9, 2010   (JP) ................. 2010-156667

(51) Int. Cl.
| | | |
|---|---|---|
| *G06F 17/00* | (2006.01) | |
| *G06F 19/00* | (2011.01) | |
| *B60W 30/02* | (2012.01) | |
| *B60K 28/16* | (2006.01) | |
| *B60K 17/344* | (2006.01) | |
| *B60K 23/08* | (2006.01) | |
| *B60W 30/045* | (2012.01) | |
| *B60W 10/119* | (2012.01) | |
| *F16H 48/20* | (2012.01) | |
| *B60W 10/16* | (2012.01) | |
| *F16H 48/19* | (2012.01) | |

(52) U.S. Cl.
CPC ........ *B60W 10/119* (2013.01); *F16H 2048/205* (2013.01); *B60W 10/16* (2013.01); *B60K 17/344* (2013.01); *B60K 23/0808* (2013.01); *B60W 30/045* (2013.01); *F16H 48/19* (2013.01); *B60W 2720/403* (2013.01); *B60W 272/406* (2013.01); *B60W 2720/28* (2013.01)
USPC .................. 701/69; 701/72; 701/90; 180/282

(58) Field of Classification Search
CPC ............... B60T 7/12; B60T 8/32; G05D 1/00; G06F 17/00; G06F 19/00; B60R 22/00; B60W 10/14; B60W 17/36; B60K 17/34
USPC ............. 701/1, 51, 53, 58, 60, 65, 67, 68, 69, 701/70, 71, 72, 74, 76, 77, 78, 80, 81, 82, 701/88, 89, 90; 180/170, 197, 271, 282; 340/438, 439, 440, 441
See application file for complete search history.

(56) References Cited

U.S. PATENT DOCUMENTS

| | | | | |
|---|---|---|---|---|
| 4,871,043 A | * | 10/1989 | Fujii et al. ...................... | 180/248 |
| 5,301,768 A | * | 4/1994 | Ishikawa et al. .............. | 180/249 |
| 5,456,641 A | * | 10/1995 | Sawase ........................... | 475/86 |
| 5,701,247 A | * | 12/1997 | Sasaki ............................ | 701/1 |
| 5,740,877 A | * | 4/1998 | Sasaki ........................... | 180/248 |
| 5,754,970 A | * | 5/1998 | Takasaki et al. ................ | 701/87 |
| 5,803,197 A | * | 9/1998 | Hara et al. .................... | 180/248 |

FOREIGN PATENT DOCUMENTS

| | | |
|---|---|---|
| JP | 62-181918 | 8/1987 |
| JP | 03-189241 | 8/1991 |
| JP | 07-101263 | 4/1995 |
| JP | 10-016599 | 1/1998 |

OTHER PUBLICATIONS

An English translation of the Japanese Notification of Reasons for Rejection of corresponding Japanese Application No. 2010-156667, issued on Feb. 19, 2013.
International Search Report of PCT/JP2011/065399, dated Sep. 6, 2011, mailed Sep. 20, 2011.

\* cited by examiner

Primary Examiner — Thomas Tarcza
Assistant Examiner — Edward Pipala
(74) *Attorney, Agent, or Firm* — Global IP Counselors, LLP

(57) ABSTRACT

A rear wheel drive force difference setting gain is multiplied by a basic left-right rear wheel drive force difference steady-state control computation value for achieving a vehicle turning behavior steadily requested by a driver in order to calculate a final left-right rear wheel drive force difference steady-state control amount. The final left-right rear wheel drive force difference steady-state control amount is added to a left-right rear wheel drive force difference transient control amount to obtain left-right rear wheel rear wheel drive force difference. This difference is multiplied by feedback control coefficient to obtain a final rear wheel drive force difference. During an initial stage of turning in which a lateral acceleration is smaller than a turn initial stage determining value, the rear wheel drive force difference setting gain is set to A, which is larger than 1 and increases as the lateral acceleration decreases. As a result, the final rear wheel drive force difference is increased during the initial stage of turning and an initial turning response can be improved.

2 Claims, 4 Drawing Sheets

LEFT-RIGHT WHEEL DRIVE FORCE DISTRIBUTION CONTROL APPARATUS FOR A VEHICLE

CROSS-REFERENCE TO RELATED APPLICATIONS

This application is a U.S. National stage application of International Application No. PCT/JP2011/065399, filed Jul. 5, 2011, which claims priority claims priority under to Japanese Patent Application No. 2010-156667, filed in Japan on Jul. 9, 2010, the entire contents of which is hereby incorporated by reference.

BACKGROUND

1. Field of the Invention

The present invention generally relates to a proposal for improving a left-right wheel drive force distribution control apparatus that is useful for a vehicle, particularly a four-wheel drive vehicle.

2. Background Information

Japanese Laid-Open Patent Application Publication No. 08-121571 (FIG. 2) presents an example of a conventional left-right wheel drive force distribution control device for a vehicle. Regarding controlling a distribution of drive forces to left and right non-main drive wheels, when the vehicle is operating in a small lateral acceleration region, the proposed technology executes control such that a larger drive force difference (only a smaller drive force difference) is imposed between the left and right non-main drive wheels when a lateral acceleration is larger (smaller). Meanwhile, when the vehicle is operating in a large lateral acceleration region, the proposed technology executes control such that a only a smaller drive force difference (a larger drive force difference) is imposed between the left and right non-main drive wheels when the lateral acceleration is larger (smaller).

With such a left-right wheel drive force distribution control, when the vehicle is in the small lateral acceleration region, a braking/drive force of a turning-direction inside wheel increases as the lateral acceleration increases and the turning performance and high-speed stability can be improved. Meanwhile, when the vehicle is in the large lateral acceleration region, the braking/drive force of the turning-direction inside wheel decreases as the lateral acceleration increases and a cornering force can be secured as planned.

SUMMARY

However, with the conventional left-right wheel drive force distribution control, since only a smaller drive force difference is imposed between the left and right non-main drive wheels when the lateral acceleration is smaller while the vehicle is in the small lateral acceleration region, the drive forces of the left- and right non-main drive wheels differ only slightly in an initial stage of a turn, during which the lateral acceleration is still small in the small lateral acceleration region. Consequently, in the initial stage of the turn, the lateral acceleration and other vehicle turning behaviors rise slowly and a problem exists in that the initial turning response is poor.

The object of the present invention is to provide a vehicle left-right wheel drive force distribution control apparatus that can avoid a problem related to degradation of an initial response during an initial stage of a turn.

In order to achieve the object, the present invention is characterized by providing a vehicle left-right drive force distribution control apparatus comprising a controller. The controller is programmed to execute a distributed output of drive forces to left and right drive wheels in accordance with a front-rear wheel drive force distribution control. The controller includes a left-right wheel drive force control section, a turn initial stage detecting section and a turn initial stage left-right drive force difference increasing section. The left-right wheel drive force control section controls the drive forces of the left and right drive wheels such that a target value of a left-right drive force difference corresponding to a targeted turning behavior of the vehicle is achieved. The turn initial stage detecting section detects an initial stage of the turning behavior. The turn initial stage left-right drive force difference increasing section increases the target value of the left-right drive force difference during a period while the turn initial stage detecting section detects an initial stage of a turn. The turn initial stage left-right drive force difference increasing section increases the target value of the left-right drive force difference by multiplying the target value of the left-right drive force difference by a gain that becomes larger as the vehicle turning behavior becomes smaller while the vehicle turning behavior is in a region of the initial stage of the turn.

With a left-right wheel drive force distribution control apparatus according to the present invention, when the drive forces of the left and right drive wheels are controlled such that the target value of the left-right drive force difference corresponds to a target turning behavior, the target value of the left-right drive force difference is increased during an initial stage when the turning behavior is first starting. As a result, the rise of the turning behavior is not slow and the problem of the initial turning response being poor can be solved.

BRIEF DESCRIPTION OF THE DRAWINGS

Referring now to the attached drawings which form a part of this original disclosure.

DETAILED DESCRIPTION OF THE EMBODIMENTS

Figure 1:
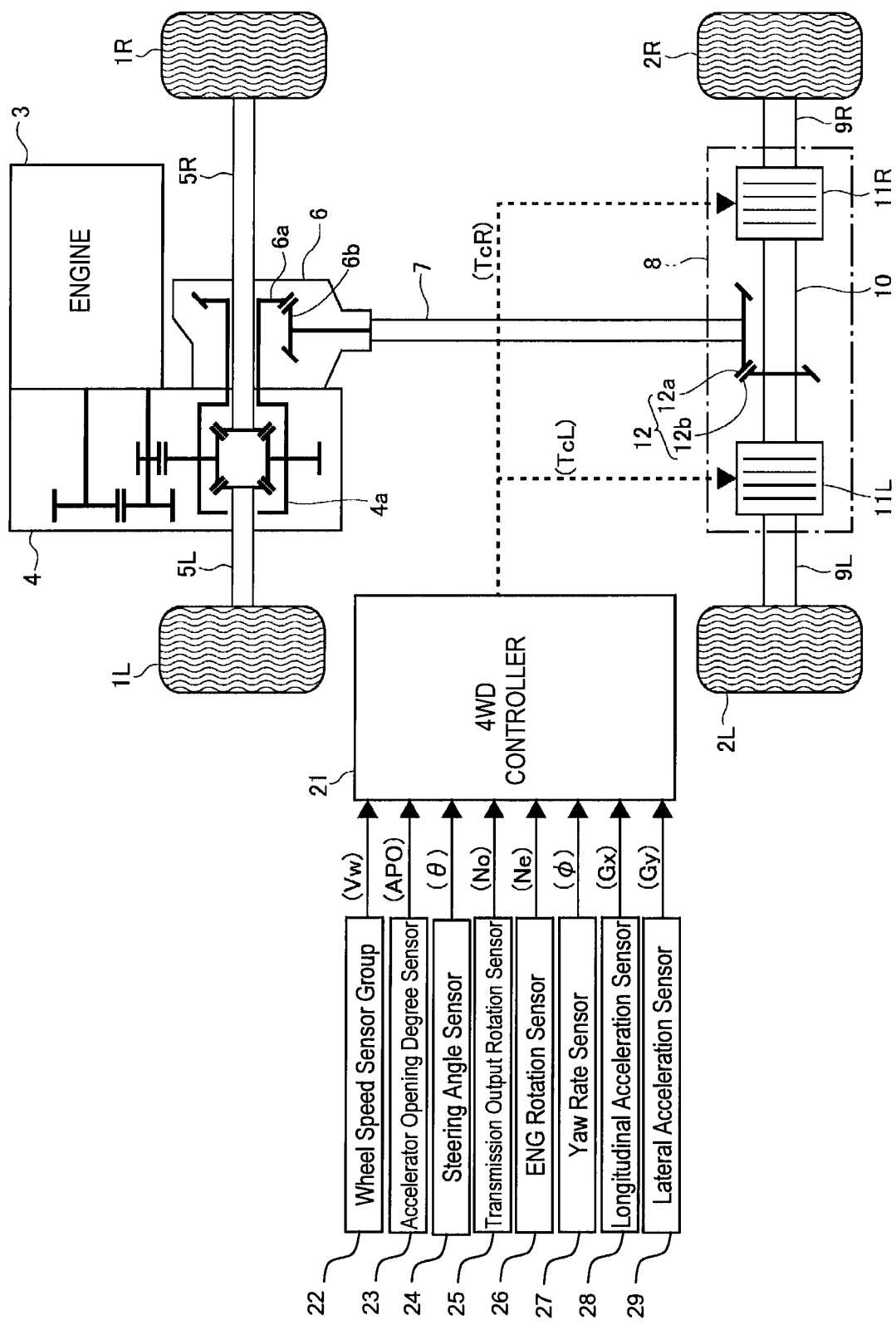
FIG. 1 is a schematic plan view showing a wheel drive train of a four-wheel drive vehicle equipped with a left-right wheel drive force distribution control apparatus according to an embodiment of the present invention as viewed from above the vehicle. A four-wheel drive control system is also shown.

Embodiments of the present invention are described in detail below with reference to the embodiments in the drawings.

FIG. 1 is a schematic plan view showing a wheel drive train of a four-wheel drive vehicle equipped with a left-right wheel drive force distribution control apparatus according to an embodiment of the present invention as viewed from above the vehicle. A four-wheel drive control system is also shown. The figure shows left and right front wheels 1L and 1R serving as main drive wheels and left and right rear wheels 2L and 2R serving as subordinate drive wheels. In this patent specification, the term "drive force" does not refer to power but, instead, refers to a torque value.

The reference numeral 3 indicates an engine serving as a prime mover. Torque from the engine 3 is multiplied by a transmission 4 (transaxle that includes a differential gear device 4a) and transferred toward the left and right front wheels 1L and 1R through left and right axle shafts 5L and 5R, thereby serving to drive the left and right front wheels 1L and 1R.

A portion of the drive force exiting the transmission 4 and heading toward the left and right front wheels 1L and 1R is redirected toward the left and right rear wheels 2L and 2R by a transfer case 6. A drive train used to accomplish this redirection will now be explained.

The transfer case 6 has a bevel gear set comprising an input hypoid gear 6a and an output hypoid gear 6b. The input hypoid gear 6a is coupled to a differential gear case serving as an input rotary member of the differential gear device 4a such that the input hypoid gear rotates together with the differential gear case. The output hypoid gear 6b is coupled to a front end of the propeller shaft 7, and the propeller shaft 7 is arranged to extend rearward toward a left-right rear wheel drive force distributing unit 8.

The transfer case 6 sets a gear ratio of the bevel gear set comprising the hypoid gear 6a and the output hypoid gear 6b such that a portion of a drive force heading toward the left and right front wheels 1L and 1R is converted to a higher rotational speed and outputted toward the propeller shaft 7.

The high-speed rotational power outputted to the propeller shaft 7 is distributed to the left and right rear wheels 2L and 2R by the left-right rear wheel drive force distributing unit 8 in accordance with a control explained later. The left-right rear wheel drive force distributing unit 8 has a center shaft 10 that is arranged between the axle shafts 9L and 9R of the left and right rear wheels 2L and 2R and extends along the axial direction of the shafts 9L and 9R. The left-right rear wheel drive force distributing unit 8 also has a left rear wheel clutch (left subordinate drive wheel friction element) 11L and a right rear wheel clutch (right subordinate drive wheel friction element) 11R. The left rear wheel clutch 11L is arranged between the center shaft 10 and the left rear wheel axle shaft 9L and serves to control a connection between the shafts 10 and 9L. The right rear wheel clutch 11R is arranged between the center shaft 10 and the right rear wheel axle shaft 9R and serves to control a connection between the shafts 10 and 9R.

A bevel gear type final reduction gear 12 is drivably connected between the center shaft 10 and a rearward end of the propeller shaft 7 extending rearward from the transfer case 6. The final reduction gear 12 comprises an input hypoid gear 12a and an output hypoid gear 12b.

The reduction gear ratio of the final reduction gear 12 is set in relation to the speed-increasing gear ratio of the transfer case 6 (speed increasing gear ratio resulting from the bevel gear set comprising the hypoid gear 6a and the output hypoid gear 6b) to such a gear ratio that the portion of the drive force heading toward the left and right front wheels 1L and 1R that is redirected toward the center shaft 10 is delivered to the center shaft 10 with an increased rotational speed. In this embodiment, a total gear ratio of the transfer case 6 and the final reduction gear 12 is set such that a rotational speed of the center shaft 10 is increased with respect to the left and right front wheels 1L and 1R.

The reason for setting the total gear ratio of the transfer case 6 and the final reduction gear 12 in this way will now be explained. If the rotational speed of the center shaft 10 is not increased, then whichever of the left and right rear wheels 2L and 2R is the outside rear wheel during the turn will rotate at a higher rotational speed than the center shaft 10. Under such conditions, if the clutch 11L (or 11R) corresponding to the rear wheel 2L (or 2R) located on the outside of the turn is engaged, then the high rotational speed of that rear wheel will be dragged down by the more slowly rotating center shaft 10 until the rotational speed decreases to the rotational speed of the center shaft 10. Consequently, the center shaft 10 will not be able to transmit a drive force to the rear wheel 2L (or 2R) located on the outside of the turn and it will not be possible to achieve the intended drive force distribution control. As a result, the four-wheel drive control will not function properly.

Therefore, in order to ensure that during a turn the rotational speed of the center shaft 10 does not fall below the rotational speed of the rear wheel 2L (or 2R) located on the outside of the turn and cause the drive force distribution control to be ineffective, the total gear ratio of the transfer case 6 and the final reduction gear 12 is set as explained previously and the center shaft 10 is rotated at an increased rotational speed as explained previously. By rotating the center shaft 10 at an increased rotational speed, the drive force distribution control explained later can be accomplished as intended.

In the wheel drive train of the four-wheel drive vehicle explained above, torque from the engine 3 is multiplied by a gear ratio at the transmission (transaxle) 4 and transferred to the left and right front wheels 1L and 1R, thus driving the left and right front wheels 1L and 1R.

While this is occurring, a portion of the drive force heading toward the left and right front wheels 1L and 1R is transferred successively from the transfer case 6 to the propeller shaft 7, to the final reduction gear 12, and to the center shaft 10 at an increased rotational speed. The holding forces of the clutches 11L and 11R are controlled such that the clutches 11L and 11R slip in accordance with the amount of rotational speed increase while the left and right rear wheels 2L and 2R are driven. Thus, with the left and right front wheels 1L and 1R and the left and right rear wheels 2L and 2R driven in this way, the vehicle can be operated in four-wheel drive.

In this four-wheel drive vehicle, it is necessary to control the holding forces of the left rear wheel clutch 11L and the right rear wheel clutch 11R. In order to further the performance of this four-wheel drive vehicle when starting into motion from a stopped condition and when accelerating, the vehicle is further configured such that a front-rear wheel drive force distribution control can be executed by controlling a total holding force of the left wheel clutch 11L and the right wheel clutch 11R. Additionally, in order to improve a turning performance of the vehicle and execute a behavior control such that an actual behavior (actual yaw rate, etc.) of the vehicle matches a target based on an operating state and a traveling condition of the vehicle, a left-right wheel drive force distribution control is executed by controlling the holding forces of the left rear wheel clutch 11L and the right rear wheel clutch 11R.

Therefore, a holding force control system of the left rear wheel clutch 11L and the right rear wheel clutch 11R is configured as will now be explained. Each of the left rear wheel clutch 11L and the right rear wheel clutch 11R is an electromagnetic clutch in which the holding force is determined based on a supplied current. A four-wheel drive (4WD) controller 21 accomplishes the aforementioned front-rear wheel drive force distribution control and left-right wheel drive force distribution control by electronically controlling electric currents supplied to the clutches 11L and 11R such that the holding forces of the clutches 11L and 11R correspond to target drive forces TcL and TcR of the left and right rear wheels 2L and 2R, respectively, which are computed as will be explained later.

In order to compute a target drive force TcL of the left wheel 2L and a target drive force TcR of the right wheel, the four-wheel drive controller 21 receives the following input signals: a signal from a wheel speed sensor group 22 that a wheel speed Vw of each of the wheels 1L, 1R, 2L, and 2R; a signal from an accelerator opening degree sensor 23 that detects an accelerator opening degree APO as an accelerator pedal depression amount; a signal from a steering sensor 24 that detects a steering wheel steering angle θ; a signal from a transmission output rotation sensor 25 that detects a transmission output rotational speed No; a signal from an engine rotation sensor 26 that detects an engine rotational speed Ne; a signal from a yaw rate sensor 27 that detects a yaw rate □ about a vertical axis passing through a center of gravity of the vehicle; a signal from a longitudinal acceleration sensor 28 that detects a longitudinal acceleration Gx of the vehicle; and a lateral acceleration signal 29 that detects a lateral acceleration Gy of the vehicle.

Based on the input information just explained, the four-wheel drive controller 21 computes a left rear wheel target drive force TcL and a right rear wheel target drive TcR to be used for the front-rear wheel drive force distribution control and the left-right wheel drive force distribution control and electronically controls the holding forces (electric currents) of the left rear wheel clutch 11L and the right rear wheel clutch 11R such that the drive forces of the left and right rear wheels 2L and 2R match the target drive forces TcL and TcR.

The front-rear wheel drive force distribution control and the left-right wheel drive force distribution control executed by the four-wheel drive controller 21, i.e., the method of setting the left rear wheel target drive force TcL and the right rear wheel target drive force TcR, will now be explained.

Figure 2:
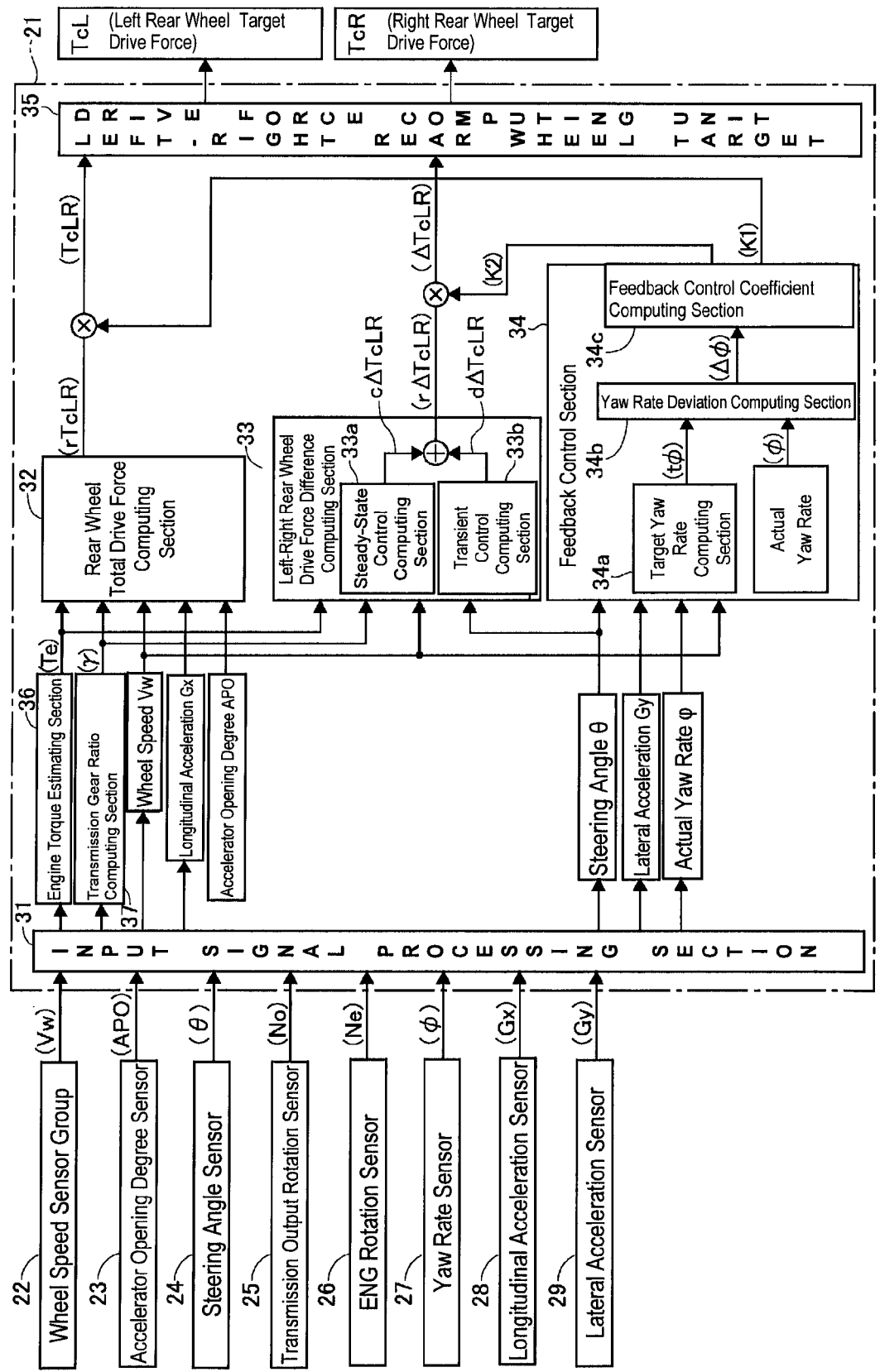
FIG. 2 is a function-specific block diagram of the four-wheel drive controller shown in FIG. 1.

As shown in function-specific block diagram of FIG. 2, the four-wheel drive controller 21 comprises an input signal processing section 31, a rear wheel total drive force computing section 32, a left-right rear wheel drive force difference computing section 33, a feedback control section 34, and a left-right rear wheel target drive force computing section 35.

The input signal processing section 31 removes noise from the detection signals of the wheel speed sensor group 22, the accelerator opening degree sensor 23, the steering angle sensor 24, the transmission output rotation sensor 25, the engine rotation sensor 26, the yaw rate sensor 27, the longitudinal acceleration sensor 28, and the lateral acceleration sensor 29 and pre-processes the signals such that they can be used in computations that will be explained later. Among these pre-processed signals, the engine rotational speed Ne and the accelerator opening degree APO are used by an engine torque estimating section 36 to estimate an engine torque Te, and the engine rotational speed Ne and the transmission output rotational speed No are used by a transmission gear ratio computing section 37 to compute a transmission gear ratio γ.

An example of how the rear wheel total drive force computing section 32 computes a total drive force target value rTcLR (hereinafter called "total drive force rTcLR") for the left and right rear wheels 2L and 2R will now be explained. First, the drive force computing section 32 computes an input torque Ti to the differential gear device 4a based on the engine torque Te and the transmission gear ratio γ. Next, the computing section 32 calculates left-right front wheel average speed and a left-right rear wheel average speed based on signals (wheel speeds Vw) from the wheel speed sensor group 22 and determines a degree of drive slippage of the left and right front wheels 1L and 1R estimated by comparing the two average speeds. The computing section 32 also determines how much of the input torque Ti to direct toward the left and right rear wheels 2L and 2R in accordance with the degree of drive slippage, the longitudinal acceleration, and the accelerator opening degree APO and sets that amount as a total drive force rTcLR to be directed to the rear wheels.

The larger the aforementioned front wheel slippage is, the larger the total drive force rTcLR to be directed to the rear wheels needs to be in order to suppress the slippage. Meanwhile, the larger the longitudinal acceleration Gx and the accelerator opening degree APO are, the larger the drive force requested by a driver is and the larger the total drive force rTcLR directed to the rear wheels needs to be in order to satisfy the request.

The left-right rear wheel drive force difference computing section 33 has a steady-state control computing section 33a and a transient control computing section 33b and calculates a drive force difference target value rΔTcLR (hereinafter called drive force difference rΔTcLR) between the left and right rear wheels 2L and 2R as, for example, will now be explained.

Figure 3:
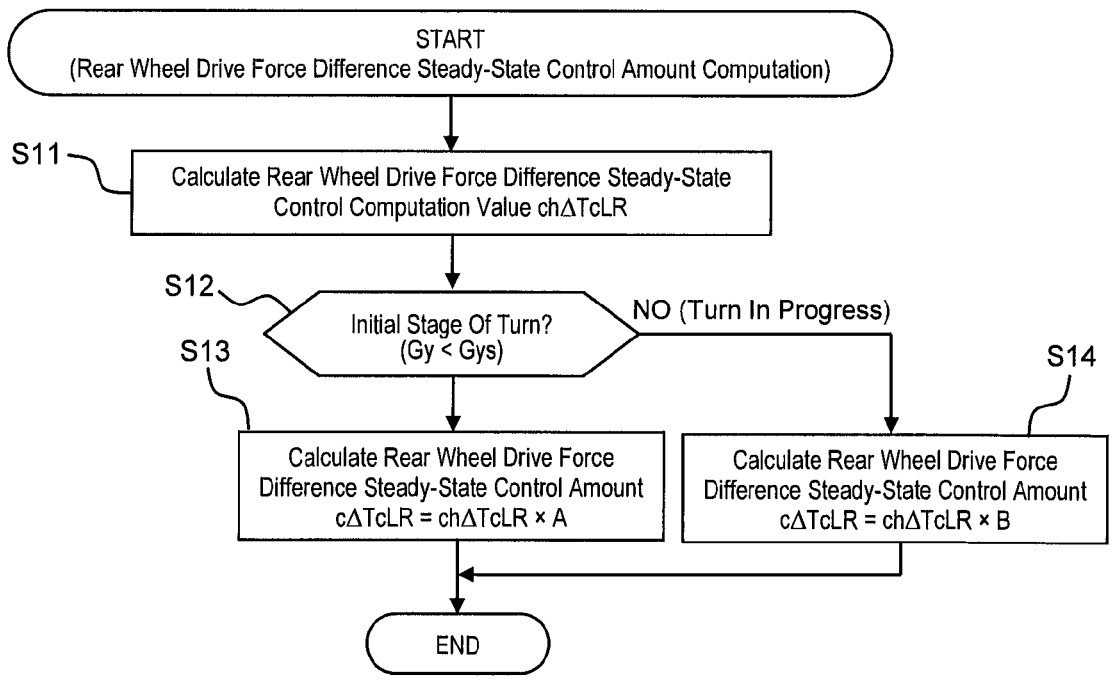
FIG. 3 is a flowchart showing a left-right rear wheel drive force difference steady-state control amount computing program executed by a state-state control computing section of a left-right rear wheel drive force difference computing section shown in FIG. 2.

The steady-state control computing section 33a executes the control program shown in FIG. 3 based on the engine torque Te, the transmission gear ratio γ, the steering angle θ, and the wheel speeds Vw (vehicle speed). Through the program, the steady-state control computing section 33a finds a basic left-right rear wheel drive force difference steady-state control computation value chΔTcLR for a vehicle turning behavior steadily requested by the driver and then finds a final left-right rear wheel drive force difference steady-state control amount cΔTcLR by multiplying the basic computation value by a rear wheel drive force difference setting gain Gain determined as exemplified by the solid curve shown in FIG. 4 (a).

More specifically, in step S11 of FIG. 3, the steady-state control computing section 33a finds the basic left-right rear wheel drive force difference steady-state control computation value chΔTcLR for the vehicle turning behavior steadily requested by the driver as will now be explained. The steady-state control computing section 33a estimates a longitudinal acceleration rate Gx of the vehicle based on the engine torque Te and the transmission gear ratio γ and a lateral acceleration rate Gy of the vehicle based on a steering angle θ and a vehicle speed VSP. An under-steering trend (state in which an actual turning behavior is insufficient in relation to a target turning behavior) can be ascertained based on a combination of the estimated longitudinal acceleration rate Gx and the lateral acceleration rate Gy. The steady-state control computing section 33a determines a left-right rear wheel drive force difference necessary to dissolve the under-steering state as a steady-state control computation value chΔTcLR. Thus, step S11 corresponds to the left-right wheel drive force control means mentioned in the claims. The reason the steady-state control computing section 33a uses estimated values of the longitudinal acceleration rate Gx and the lateral acceleration rate Gy instead of detected values is that the steady-state control computing section 33a is a feed forward control system and an estimated value matches the actual state of the control better than a detected value, which is a result value.

Thus, while the steering angle θ is near 0 (while the wheels are not being turned), the left-right rear wheel drive force difference steady-state control computation value chΔTcLR is held at 0 because the lateral acceleration rate Gy equals 0. Conversely, while the steering angle θ is not near 0 (while the wheels are being turned), the lateral acceleration rate Gy increases as the steering angle θ and the vehicle speed VSP increase and there is a strong tendency for the vehicle to experience under-steering. Consequently, the left-right rear wheel drive force difference steady-state control computation value chΔTcLR increases. Furthermore, as the longitudinal acceleration rate Gx increases, the tendency for the vehicle to experience under-steering strengthens and the left-right rear wheel drive force difference steady-state control computation value chΔTcLR increases.

In step S12, the steady-state control computing section 33a determines if the vehicle is in the initial stage of a turn or if turning is in progress by determining if the lateral acceleration Gy is smaller than a turn initial stage determination value Gys. Thus, step S12 corresponds to the turn initial stage detecting means mentioned in the claims.

Figure 4:
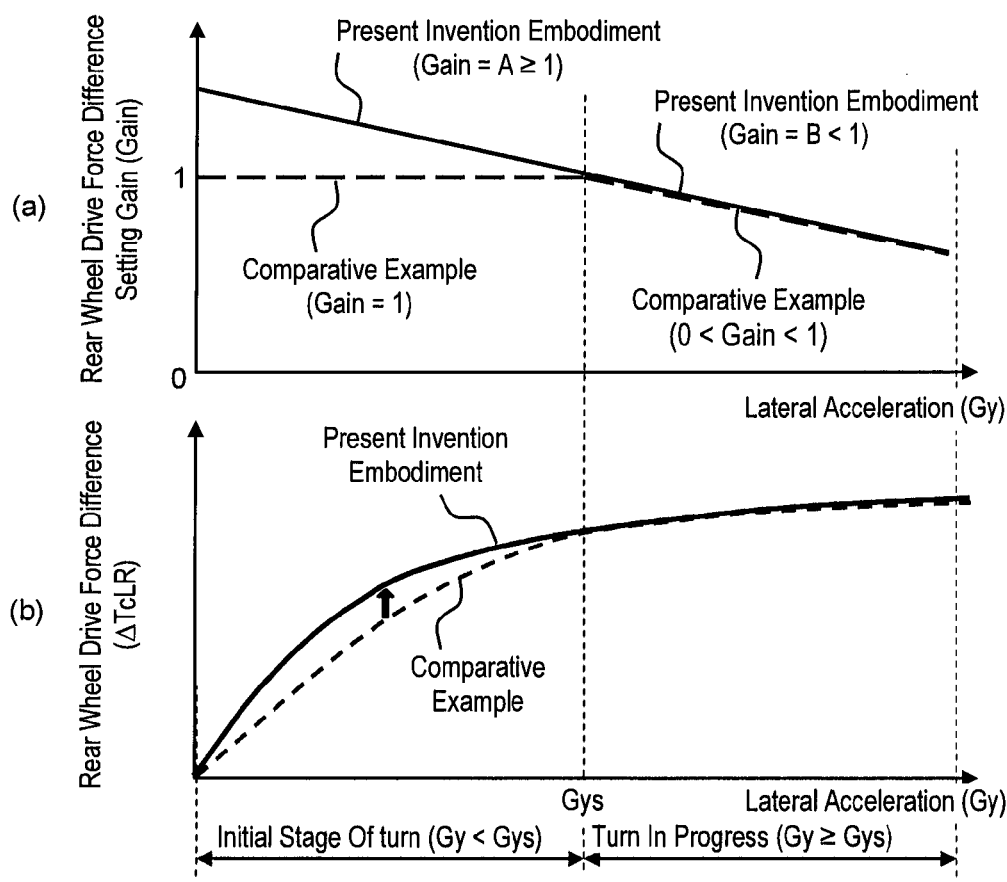
FIG. 4 shows a characteristic curve of a left-right rear wheel drive force difference setting gain Gain used by the computing program shown in FIG. 3 and a characteristic curve of a left-right rear wheel drive force difference ΔTcLR obtained using the left-right rear wheel drive force difference setting gain Gain. Portion (a) is a characteristic curve diagram of the left-right rear wheel drive force difference setting gain Gain, and portion (b) is a characteristic curve diagram of the left-right rear wheel drive force difference ΔTcLR.

If it determines in step S12 that the vehicle is in the initial stage of a turn (Gy<Gys), then the steady-state control computing section 33a proceeds to step S13 and finds the left-right rear wheel drive force difference steady-state control amount cΔTcLR (=chΔTcLR×A) by multiplying the basic left-right rear wheel drive force difference steady-state control computation value chΔTcLR found in step S11 by a rear wheel drive force difference setting gain Gain=A (≥1) obtained from the solid curve of FIG. 4 (a) at the aforementioned small lateral acceleration (Gy<Gys). Thus, step S13 corresponds to the turn initial stage left-right drive force difference increasing means mentioned in the claims.

If it determines in step S12 that the vehicle is undergoing a turn in progress (Gy≥Gys), then the steady-state control computing section 33a proceeds to step S14 and finds the left-right rear wheel drive force difference steady-state control amount cΔTcLR (=chΔTcLR×B) by multiplying the basic left-right rear wheel drive force difference steady-state control computation value chΔTcLR found in step S11 by a rear wheel drive force difference setting gain Gain=B (<1) obtained from the solid curve of FIG. 4 (a) at the aforementioned large lateral acceleration (Gy≥Gys).

As illustrated by the solid curve in FIG. 4 (a), the rear wheel drive force difference setting gain Gain has a value A that is equal to or larger than 1 and is larger when the lateral acceleration Gy is smaller during an initial stage of a turn (Gy<Gys). Meanwhile, as illustrated by the solid curve in FIG. 4 (a), the rear wheel drive force difference setting gain Gain has a value B that is smaller than 1 and is smaller when the lateral acceleration Gy is larger when a turn is in progress (Gy≥Gys).

The transient control computing section 33b serves to find a left-right rear wheel drive force difference transient control amount dΔTcLR for achieving a turning response requested transiently by the driver through a change rate of the steering angle θ. Based on the steering angle θ and the wheel speeds Vw (vehicle speed), the transient control computing section 33b computes a target yaw rate tΦ desired by the driver. Since a higher change rate of the target yaw rate tΦ indicates that a higher turning response is desired, the left-right rear wheel drive force difference transient control amount dΔTcLR is set to be larger when the change rate of the target yaw rate tΦ is higher.

The left-right rear wheel drive force difference computing section 33 calculates a sum value of the left-right rear wheel drive force difference steady-state control amount cΔTcLR calculated by the steady-state control computing section 33a as explained previously and the left-right rear wheel drive force difference transient control amount dΔTcLR calculated by the transient control computing section 33b as explained previously and sets the sum value as a left-right rear wheel drive force difference rΔTcLR to serve as a target during the vehicle turning behavior.

When there is an under-steering trend, there are no harmful effects associated with operating the vehicle in four-wheel drive such that the rear wheels are driven and it is good to continue driving the rear wheels for the sake of traction. However, there are harmful effects that occur if a drive force difference control is executed which sets a drive force difference between the left and right rear wheels and it is better not to set a drive force difference between the left and right rear wheels in order to avoid those harmful effects. Meanwhile, when there is an over-steering trend, the behavior of the vehicle will become unstable if the vehicle is operated in four-wheel drive such that the rear wheels are driven and it is better not to execute a distribution of drive force to the rear wheels in order to avoid such behavior instability.

In order to meet these demands, the feedback control section 34 revises the rear wheel total drive force rTcLR and the rear wheel drive force difference rΔTcLR as will now be explained in order to obtain a final rear wheel total drive force TcLR and a final rear wheel drive force difference ΔTcLR.

The feedback control section 34 has a target yaw rate computing section 34a, a yaw rate deviation computing section 34b, and a feedback control coefficient computing section 34c. The target yaw rate computing section 34a computes a target yaw rate t□ desired by the driver based on the steering angle θ, the lateral acceleration Gy, and the vehicle speed VSP as calculated based on the wheel speeds Vw. The yaw rate deviation computing section 34b computes a yaw rate deviation Δ□(=□−t□) between the target yaw rate t□ and a detected actual yaw rate □.

Based on the yaw rate deviation Δ□, the feedback control coefficient computing section 34c determines if the vehicle is in an over-steered state in which the actual yaw rate □ exceeds the target yaw rate t□ beyond a dead band, in an under-steered state in which the actual yaw rate □ is insufficient with respect to the target yaw rate t□ beyond a dead zone, or in a neutral steering state in which the actual yaw rate □ is within dead zones in front of and behind the target yaw rate t□. Based on this determination result, the feedback control coefficient computing section 34c sets a feedback control coefficient K1 (0 or 1) for the rear wheel total drive force rTcLR and a feedback control coefficient K2 (0 or 1) for the rear wheel drive force difference rΔTcLR.

The feedback control coefficient K1 is multiplied by the rear wheel total drive force rTcLR to calculate a revised final rear wheel total drive force TcLR, and the feedback control coefficient K2 is multiplied by the rear wheel drive force difference rΔTcLR to calculate a revised final rear wheel drive force difference ΔTcLR.

Regarding setting the feedback control coefficients K1 and K2, if the feedback control coefficient computing section 34c determines that the vehicle is in an over-steered state (Φ>tΦ+ dead band), then it sets the feedback control coefficient K1 for the rear wheel total drive force rTcLR to 0 and sets the feedback control coefficient K2 for the rear wheel drive force difference rΔTcLR to 0 in order to eliminate behavior instability because operating the vehicle in four-wheel drive such that the rear wheels are driven at all would cause the vehicle behavior to become unstable. Setting the feedback control coefficient K1 to 0 causes the revised final rear wheel total drive force TcLR to be 0, and setting the feedback control coefficient K2 to 0 causes the revised final rear wheel drive force difference ΔTcLR to be 0. This means the vehicle travels in two-wheel drive (front-wheel drive) and, as a result, the harmful effects of behavior instability that could result from continuing to travel in four-wheel drive while in an over-steered state can be eliminated.

If the feedback control coefficient computing section 34c determines that the vehicle is in an under-steered state ($\Phi<t\Phi$–no dead band), then it sets the feedback control coefficient K1 for the rear wheel total drive force rTcLR to 1 and sets the feedback control coefficient K2 for the rear wheel drive force difference r$\Delta$TcLR to 0. Setting the feedback control coefficient K1 to 1 causes the revised final rear wheel total drive force TcLR to be set as TcLR=rTcLR, and setting the feedback control coefficient K2 to 0 causes the revised final rear wheel drive force difference $\Delta$TcLR to be 0. This means that the vehicle is operated in four-wheel drive but a drive force difference is not set between the left and right rear wheels. As a result, the aforementioned demands can be satisfied in the under-steered state ($\Phi<t\Phi$) and the excellent traction of four-wheel drive can be enjoyed while eliminating the harmful effects of setting a drive force difference between the left and right rear wheels.

If the feedback control coefficient computing section 34c determines that the vehicle is in a neutral steering state (t$\Phi$–dead band<$\Phi$<t$\Phi$+dead band), then the feedback control coefficient computing section 34c sets the feedback control coefficient K1 for the rear wheel total drive force rTcLR to 1 and sets the feedback control coefficient K2 for the rear wheel drive force difference r$\Delta$TcLR to 1 because there are no harmful effects caused by four-wheel drive travel and no harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 1 causes the revised final rear wheel drive force difference $\Delta$TcLR to be set as $\Delta$TcLR=r$\Delta$TcLR. This means that the vehicle is operated in four-wheel drive and a drive force difference is set between the left and right rear wheels.

Figure 5:
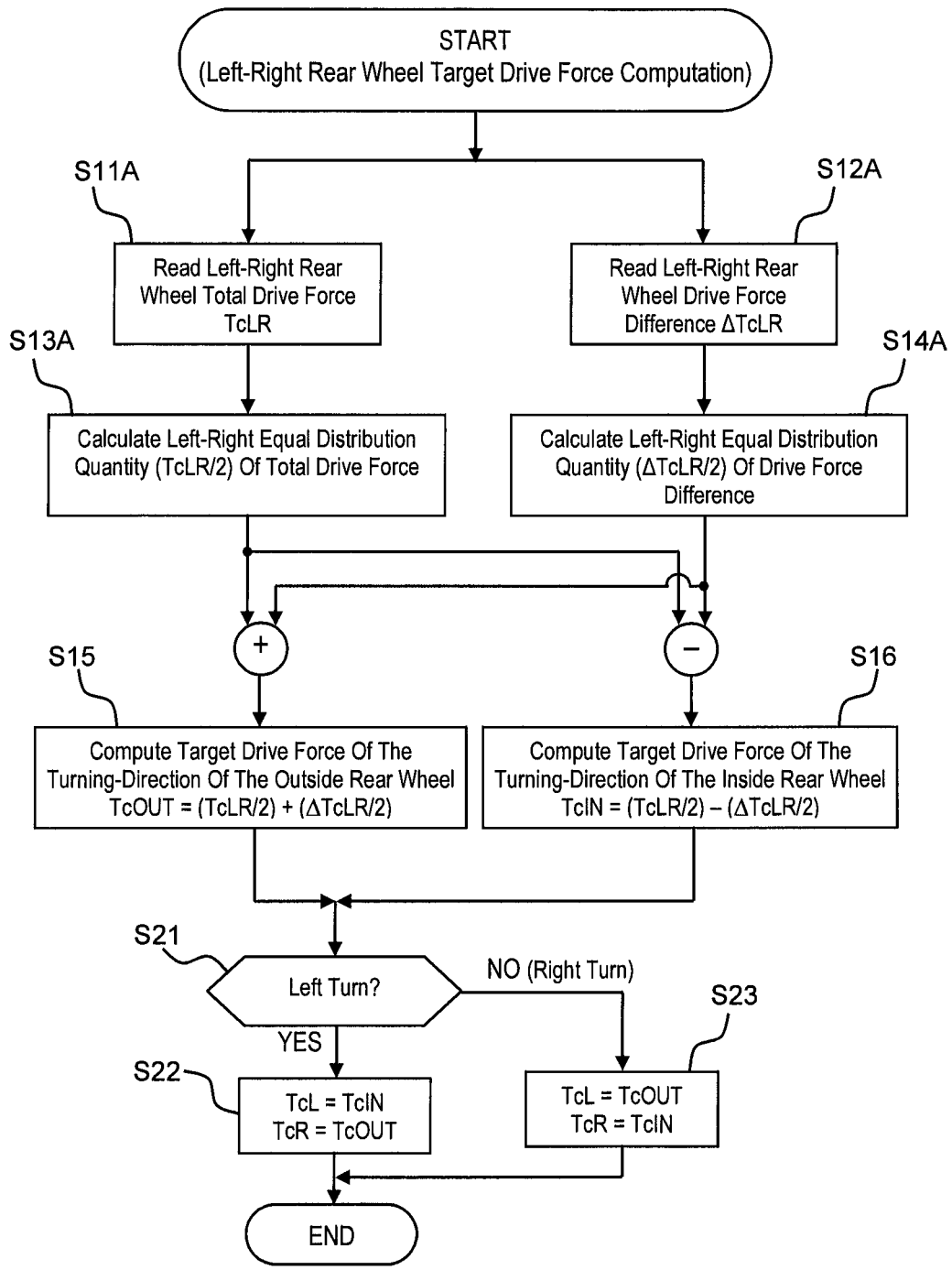
FIG. 5 is a flowchart showing a process by which the left-right rear wheel target drive force computing section shown in FIG. 2 computes left and right rear wheel target drive forces.

Based on the process shown in FIG. 5, the left-right rear wheel target drive force computing section 35 calculates a left rear wheel target drive force TcL and a right rear wheel target drive force TcR that satisfy both the left-right rear wheel total drive force TcLR and the left-right rear wheel drive force difference $\Delta$TcLR, which are to be the revised final targets.

In step S11A, the left-right rear wheel target drive force computing section 35 reads the final rear wheel total drive force TcLR revised by the previously explained feedback control, and in step S12A, the left-right rear wheel target drive force computing section 35 reads the final left-right rear wheel drive force difference $\Delta$TcLR revised by the feedback control.

In step S13A, the left-right rear wheel target drive force computing section 35 calculates a left-right equal distribution quantity TcLR/2 of the rear wheel total drive force TcLR read in step S11A, and in step S14A the left-right rear wheel target drive force computing section 35 calculates a left-right equal distribution quantity $\Delta$TcLR/2 of the rear wheel drive force difference $\Delta$TcLR read in step S12A. In step S15, the left-right rear wheel target drive force computing section 35 adds the rear wheel drive force difference left-right equal distribution quantity $\Delta$TcLR/2 to the rear wheel total drive force left-right equal distribution quantity TcLR/2 to calculate a target drive force TcOUT (=TcLR/2+$\Delta$TcLR/2) of the turning-direction outside rear wheel. In step S16, the left-right rear wheel target drive force computing section 35 subtracts the rear wheel drive force difference left-right equal distribution quantity $\Delta$TcLR/2 from the rear wheel total drive force left-right equal distribution quantity TcLR/2 to calculate a target drive force TcIN (=TcLR/2−$\Delta$TcLR/2) of the turning-direction inside rear wheel.

Thus calculated, the target drive force TcOUT of the turning-direction outside rear wheel and the target drive force TcIN of the turning-direction inside rear wheel serve as a target drive force of the turning-direction outside rear wheel and a target drive force of the turning-direction inside rear wheel that achieve both the rear wheel total drive force TcLR and the rear wheel drive force difference $\Delta$TcLR.

In step S21 and subsequent steps, the left-right rear wheel target drive force computing section 35 sets the left rear wheel target drive force TcL and the right rear wheel target drive force TcR based on the target drive force TcOUT of the turning-direction outside rear wheel and the target drive force TcIN of the turning-direction inside rear wheel as will now be explained. First, in step S21, the left-right rear wheel target drive force computing section 35 determines if the vehicle is undergoing a left turn or a right turn based on the steering angle θ and the yaw rate $\Phi$.

If it is a left turn, then in step S22 the left-right rear wheel target drive force computing section 35 sets the inside wheel target drive force TcIN as the target drive force TcL of the left rear wheel (which is the turning-direction inside wheel) and sets the outside wheel target drive force TcOUT as the target drive force TcR of the right rear wheel (which is the turning-direction outside wheel). Conversely, if it is a right turn, then in step S23 the left-right rear wheel target drive force computing section 35 sets the outside wheel target drive force TcOUT as the target drive force TcL of the left rear wheel (which is the turning-direction outside wheel) and sets the inside wheel target drive force TcIN as the target drive force TcR of the right rear wheel (which is the turning-direction inside wheel).

The four-wheel drive controller 21 shown in FIG. 1 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR set by the computing section 35 shown in FIG. 2 as explained previously.

Effects that are obtained with a left-right wheel (left and right rear wheels) drive force distribution control for a four-wheel drive vehicle according to the embodiment explained heretofore will now be explained. The steady-state control computing section 33a shown in FIG. 2 executes the control shown in FIG. 3 to find the left-right rear wheel drive force difference steady-state control amount c$\Delta$TcLR for achieving a vehicle turning behavior requested steadily by the driver. It does not set the basic left-right rear wheel drive force difference steady-state control computation value ch$\Delta$TcLR for the vehicle turning behavior directly as the left-right rear wheel drive force difference steady-state control amount c$\Delta$TcLR. Instead, during a period when it determines in step S12 that the vehicle is in the initial stage of turning (lateral acceleration Gy<Gys), the steady-state control computing section 33a proceeds to step S13 and finds the final left-right rear wheel drive force difference steady-state control amount c$\Delta$TcLR by multiplying the basic left-right rear wheel drive force difference steady-state control computation value ch$\Delta$TcLR by the rear wheel drive force difference setting gain Gain=A ($\geq$1) obtained from the solid curve of FIG. 4 (a).

As shown in FIG. 2, the sum value of this left-right rear wheel drive force difference steady-state control amount c$\Delta$TcLR and the left-right rear wheel drive force difference transient control amount d$\Delta$TcLR computed by the transient control computing section 33b, i.e., the left-right rear wheel drive force difference r$\Delta$TcLR, is multiplied by the feedback control coefficient K2 to obtain the final rear wheel drive force difference $\Delta$TcLR. As indicated by the solid curve of FIG. 4 (b), in the initial stage of turning (when lateral acceleration Gy<Gys), the rear wheel drive force difference $\Delta$TcLR obtained with the embodiment is larger than the rear wheel drive force difference obtained with the conventional technology, which sets the gain to Gain=1 as indicated in the same drawing with a broken curve. As a result, the turning behavior (yaw rate $\Phi$) can be made to rise more quickly and the initial stage turning response can be improved.

Moreover, in the embodiment, as indicated by the solid curve of FIG. 4 (a), the rear wheel drive force difference setting gain Gain=A ($\geq$1) is larger when the lateral acceleration Gy is smaller during the initial stage of turning (Gy<Gys). Thus, even within the same initial stage (Gy<Gys), the degree to which the rear wheel drive force difference $\Delta$TcLR is increased is larger at earlier points in time than at later points in time. As a result, the turning behavior (yaw rate $\Phi$) can be made to riser earlier and the initial stage turning response can be improved even more reliably.

Although in the previously explained embodiment the initial stage of turning is determined to exist when the lateral acceleration Gy is smaller than the turn initial stage determining value Gys, the invention is not limited to basing the determination on the lateral acceleration Gy. It is also acceptable to determine if the initial stage of turning exists by determining if another turning behavior is smaller than a turn initial stage determining value.

Also, instead of the simple approach of determining if the initial stage of turning exists based solely on a turning behavior, it is acceptable to detect a start of a turning behavior or a start of a steering operation and determine that the initial stage of turning exists when a prescribed amount of time has not yet elapsed since the start was detected and the turning behavior is smaller than the turn initial stage determining value.

The invention claimed is:

1. A vehicle left-right wheel drive force distribution control apparatus comprising:
   a controller programmed to execute a distributed output of drive forces to left and right drive wheels in accordance with a left-right wheel drive force distribution control, the controller including
      a left-right wheel drive force control section that controls the drive forces of the left and right drive wheels such that a target value of a left-right drive force difference corresponding to a targeted turning behavior of the vehicle is achieved;
      a turn initial stage detecting section that detects an initial stage of a vehicle turning behavior; and
      a turn initial stage left-right drive force difference increasing section that increases the target value of the left-right drive force difference during a period while the turn initial stage detecting section detects an initial stage of a turn,
   the turn initial stage left-right drive force difference increasing section increasing the target value of the left-right drive force difference by multiplying the target value of the left-right drive three difference by a gain that becomes larger as the vehicle turning behavior becomes smaller while the vehicle turning behavior is in a region of the initial stage of the turn.

2. The vehicle left-right wheel drive force distribution control apparatus according to claim 1, wherein
   the turn initial stage detecting section determines that the initial stage of the turn exists during a period while the vehicle turning behavior is smaller than a set value.

* * * * *